United States Patent [19]

Rothenberg et al.

[11] Patent Number: 5,847,056
[45] Date of Patent: Dec. 8, 1998

[54] METHOD OF MAKING POLYMERS CONTAINING HYDROXAMATE FUNCTIONAL GROUPS

[75] Inventors: Alan S. Rothenberg, Wilton; Morris E. Lewellyn, Stratford; C. Joseph Calbick, Weston, all of Conn.

[73] Assignee: Cytec Technology Corp., Wilmington, Del.

[21] Appl. No.: 886,228

[22] Filed: Jul. 1, 1997

Related U.S. Application Data

[63] Continuation of Ser. No. 626,297, Apr. 1, 1996, abandoned.

[51] Int. Cl.$^6$ .................................. C08F 8/32; C08F 8/14
[52] U.S. Cl. .................. 525/380; 525/329.7; 525/330.1; 525/330.3; 525/330.5; 525/384
[58] Field of Search .................................. 525/380, 330.5, 525/329.7, 330.1, 353

[56] References Cited

U.S. PATENT DOCUMENTS 4,874,539 10/1989 Huffman .
5,395,897 3/1995 Hurlock et al. .
5,405,898 4/1995 Sommese .

FOREIGN PATENT DOCUMENTS 0 514 649 A1 11/1992 European Pat. Off. .

*Primary Examiner*—Fred Zitomer
*Attorney, Agent, or Firm*—Frank M. Van Riet; Joseph J. Mallon

[57] ABSTRACT

A process is disclosed for the formation of highly anionic hydroxamic acid polymers whereby (meth) acrylic acid polymers are esterified in aqueous solution to poly (meth) acrylates. The resultant polymers are then reacted with an hydroxylamine to produce hydroxamated (meth) acrylic acid containing polymers. The esterified polymers, their hydroxamated derivatives and their use to flocculate Bayer Process streams are also disclosed.

12 Claims, No Drawings

METHOD OF MAKING POLYMERS CONTAINING HYDROXAMATE FUNCTIONAL GROUPS

This is a continuation of application(s) Ser. No. 08/626,297, filed on Apr. 1, 1996, now abandoned.

BACKGROUND OF THE INVENTION

The production of hydroxamate group containing polymers has become of increased importance in the last few years, mostly due to the increased use of such polymers as flocculants in the Bayer Process for the recovery of alumina. The polymers have become accepted worldwide and have virtually replaced the acrylates, especially in the separation of red mud in the primary settlers.

Primarily, these hydroxamated polymers have been prepared from acrylamide-based polymers by reaction with a hydroxylamine under basic conditions, e.g. a pH of over about 9, see U.S. Pat. Nos. 4,902,751 and 5,128,420.

Other procedures for preparing hydroxamated polymers have also been patented, see U.S. Pat. No. 4,868,248, which discloses the use of polyacrylic acid as a starting material instead of an amide polymer. Although this process provides a high degree of anionicity to the hydroxamated polymer, the process suffers from various disadvantages which renders it less useful from a commercial standpoint in that the reaction is conducted under acidic conditions, i.e., a pH of 1–6 and appears to be limited to the use of rather low molecular weight polymers.

In U.S. Pat. No. 4,767,540, there is disclosed a method whereby acrylic acid-methyl acrylate copolymers are hydroxamated. The copolymers are disclosed as being produced directly from the corresponding monomers, i.e., acrylic acid and methyl acrylate and where low amounts of methyl acrylate result in the copolymer, e.g. 10%, low conversion of the ester to the hydroxamate is reported. Additionally, because of the presence of the acrylate monomer, the molecular weights of the resultant polymers are far lower than would be preferred for most applications. Similar low molecular weight polymers are taught in U.S. Pat. No. 4,587,306 as drilling mud additives.

Although the acrylamide-based hydroxamated polymers have found enormous success in the marketplace, there still remains certain applications for which high molecular weight hydroxamated polymers containing higher levels of acrylic acid moieties than are obtainable using previously available processes may be preferred. It was recognized that if hydroxamated polymers could be prepared at a high molecular weight and contain both hydroxamate groups and acrylic acid groups, both of which have been found to be effective in the primary settlers, without the presence of non-ionic acrylamide groups which are known to be detrimental therein, a more efficient flocculation of Bayer Process streams may be achieved by the user thereof.

While hydroxamation of esters proceeds readily under easily controlled conditions, the resultant polymers do not possess a sufficiently high molecular weight so as to be commercially attractive because polymerization of acrylic acid esters per se results in polymers having molecular weights which are less than those preferred for flocculation purposes. See H. L. Cohen, "Journal of Poly Science," Volume 14, pages 7–22 (1976); Maa, Macromolecules, Volume 22, pages 2036–2039 (1989); Cho, Macromolecules; Volume 17, pages 2937–2939 (1984). Kern, "Angewandte Chemie" Volume 69, Jahrg. 1957; Nr. 5 pages 153–171 Hatano, CA 65–15532(g); Renfrow, "Journal of American Chemical Society," Volume 59, pages 2308–2314 (1937).

On the other hand, acrylic acid monomers (or their salts) polymerize readily to high molecular weight polymers but are less easily hydroxamated than the acrylate esters. See U.S. Pat. No. 4,868,248; Vranken et al, Journal of Poly Science, Volume XIV, pages 521–534 (1954), in that acidic conditions are required to be used.

Furthermore, in the hydroxamation of ester group containing polymers, solvents must be employed because the polymers are generally not water-soluble, thereby rendering the reaction dangerous and environmentally unattractive. The ester group containing polymers, because of their insolubility, also cannot be polymerized via water-in-oil (inverse) emulsion polymerization, a procedure which is effective for obtaining high molecular weight polymers, because the monomers are soluble in the oil phase of the emulsions.

SUMMARY OF THE INVENTION

A novel procedure has now been found whereby high molecular weight, highly anionic polymers are produced, which polymers contain both acrylate ester and acrylic acid linkages, optionally with other pendant groups. The procedure comprises esterifying a high molecular weight acrylic acid polymer in aqueous solution. The resultant polymer is then hydroxamated.

Petrie, Analytical Chemistry, Volume 37, No. 7, pages 919–920, June 1965 teaches that a hydroxamic acid chelate ion exchange resin can be formed from Amberlite IRC-50 (a weakly acidic cation exchanger containing 4 percent crosslinkage made from methacrylic acid and divinyl benzene) by a process disclosed by Renfrow, Journal of American Chemistry Society Volume 59, pages 2308 (1937); however, all reactions are conducted in organic solvent solution and no polymerizable monomers are disclosed, much less polymers.

DESCRIPTION OF THE INVENTION INCLUDING PREFERRED EMBODIMENTS

The present invention relates to a process which comprises esterifying a water-soluble polymer of a (meth)acrylic acid or salt thereof having a molecular weight of over about one million in aqueous solution to provide a (meth)acrylic acid alkyl (meth)acrylate polymer. In a second phase of the process, the resultant esterified polymer is hydroxamated.

The instant invention also relates to water-soluble polymers of (meth) acrylic acid and a (meth) acrylic acid ester, the polymers having a weight average molecular weight of over about 10,000,000. Preferably, the polymers are comprised of (meth) acrylic acid and alkyl (meth) acrylate units represented by the formula (I):

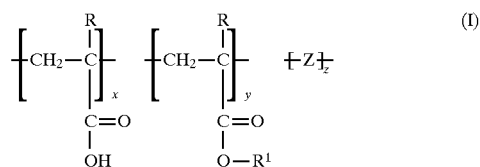

wherein each R is, individually, hydrogen or methyl $R^1$ is a $C_1$–$C_4$ alkyl group, Z is the polymerization residue of a monoethylenically unsaturated monomer copolymerizable with (meth) acrylic acid, x ranges from about 5 to about 95, preferably about 10 to about 90, y ranges from about 5 to about 50, preferably about 10 to about 40, and z ranges from about 0 to about 90, preferably about 0 to about 80.

This invention also relates to hydroxamated polymers of those polymers of formula I wherein from about 5% to about 100% of the ester groups thereof are hydroxamated to

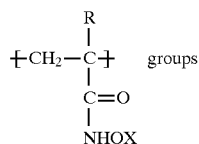 groups wherein X is hydrogen or a cation.

Also falling within the scope of the present invention is the use of the above-described hydroxamated polymers in the removal of suspended solids from the Bayer alumina process wherein a Bayer Process stream is contacted with the hydroxamated, water-soluble polymer of (meth) acrylic acid and (meth) acrylic acid ester having a weight average molecular weight of over about 10,000,000 in an amount effective to flocculate the suspended solids therein and the flocculated solids are removed.

The polymers are added to the Bayer Process streams in the form of dilute aqueous solutions in an amount at least sufficient to flocculate the suspended solids therein. Generally, satisfactory results are achieved when from about 0.1 mg of the polymer per liter of the process stream are employed, preferably from about 1.0 mg of polymer per liter of process stream.

Amounts of added polymer may deviate from the above-disclosed amounts and still fall within the scope of the present invention as long as the desired flocculation is achieved.

The esterification is carried out by reacting the acrylic acid polymer in aqueous solution with an alkylating agent to convert at least a portion of the acrylic acid groups to the corresponding esters. Basically, any water-soluble polymer containing carboxylic acid groups or their salts can be used in the present process, however, acrylic acid and methacrylic acid polymers are preferred. The (meth) acrylic acid polymer should contain at least about 10 percent, by weight, of the (meth) acrylic acid, the remainder being any monomer copolymerizable therewith which will result in a water-soluble polymer. Preferably, the polymer should have at least 25 weight percent of (meth) acrylic acid recurring units in its structure, and most preferably the polymer is homopolymer of (meth) acrylic acid or salt thereof.

The charge polymers of (meth) acrylic acid should have a molecular weight of at least about 1 million, preferably at least about 5 million and most preferably, at least about 10 million.

The esterification reaction may be conducted on the polymer of (meth) acrylic acid in aqueous solution. By the term "aqueous solution", as used herein, is meant, solutions of the polymer in water, dispersions of the polymer in water, or water-in-oil emulsions as described in U.S. Pat. Nos. 3,284,393; 5,354,801, hereby incorporated herein by reference, in macro or micro sized micelles of the aqueous polymer solution. Esterification (and subsequent hydroxamation) of the polymer in aqueous solution as a water-in-oil emulsion is preferred.

Any known alkylating agent may be used to esterify the (meth) acrylic acid polymer with dialkyl sulfates such as dimethyl sulfate, diethyl sulfate being preferred. Other useful alkylating agents include the alkyl halides such as methyl chloride, ethyl chloride, allyl chloride, methyl bromide, methyl iodide; the halohydrins such as epichlorohydrin; the alkylene oxides such as ethylene oxide, propylene oxide; 1,2-epoxybutane and the like. When the alkyl halides are used in esterifying the (meth) acrylic acid polymer, catalysts such as potassium iodide may be used so as to accelerate and improve the reaction efficiency. Additionally, those alkylating agents which are gases under the conditions of the esterification reaction should be used under pressure.

The esterification reaction is conducted at a temperature ranging from about 0° to about 80° C., preferably from about 10° to about 70° C. such as to provide at least about 5 percent ester groups in the resultant polymer, the only criteria being that the resultant esterified polymer must be either soluble in the water of the reaction media or reactively dispersed therein. Preferably, conversion of the available carboxyl groups of the polymer to ester groups should result in from about 5–50 percent, most preferably about 10–40 percent, of the ester groups in the resultant polymer.

The novel process comprising the hydroxamation of the esterified polymer discussed above is carried out under at least slightly basic conditions, i.e., at a pH of at least over 7.0 so as to neutralize the hydroxylamine salt with which the esterified polymer is reacted. The slightly basic conditions can be effected by addition of caustic, e.g. NaOH as is known in the art, or by the use of a carbonate such as, for example, sodium carbonate.

Temperatures ranging from about 10° C. to about 80° C. may be employed and from at least about 5 percent, by weight, of the available ester groups of the esterified (meth) acrylic acid polymer are hydroxamated, preferably at least about 10 percent, by weight. Most preferably, all the ester groups are hydroxamated. The hydroxamation procedure disclosed in the above-referenced U.S. Pat. No. 4,902,751 to Lewellyn et al may be followed for the hydroxamation step of the instant process, said patent hereby being incorporated herein by reference.

Exemplary hydroxylamine salts include the phosphates, perchlorates, sulfates, sulfites, hydrochlorides, acetates, propionates and the like with the sulfates being preferred.

Hydroxylamine to ester group mole ratios should range from about 0.1 to about 2.0, preferably about 0.5 to about 1.5.

Examples of monomer which may be copolymerized with the (meth) acrylic acid monomer to form the polymers which are esterified hereunder and which are represented by recurring unit Z, above, include maleic anhydride, vinyl acetate, vinyl pyrrolidone, styrene, acrylamide, methacrylamide, 2-acrylamido-2-methylpropane sulfonic acid, acrylonitrile and the like.

The following examples are set forth for purposes of illustration only and are not to be construed as limitations on the present invention except as set forth in the appended claims. All parts and percentages are by weight unless otherwise specified.

EXAMPLE 1

Esterification of a Sodium Poly(acrylate) Emulsion with Dimethyl Sulfate

To 300 parts of homopolymeric sodium polyacrylate oil-continuous emulsion (21.7% polymer solids; weight average M.W. range 10 to 20 million) are added 34.2 parts of dimethyl sulfate (DMS). The reactants are mixed vigorously for 2.5 hours, after which Carbon 13 NMR indicates 30% conversion of the carboxylic acid groups to the methyl ester in the final emulsion copolymer, representing an essentially quantitative yield. The weight average molecular weight remains over 10 million.

EXAMPLES 2–8

Using the general procedure described in Example 1, a range of esterified poly(acrylate) emulsions are prepared, as shown in Table I, below, with equivalent results.

TABLE I

| Example | Alkylating Agent | Addition Level, Mole % | % Acid Converted to Ester, NMR Analysis |
|---|---|---|---|
| 2 | DMS | 2 | 4 |
| 3 | DMS | 5 | 6 |
| 4 | DMS | 10 | 10 |
| 5 | DMS | 15 | 16 |
| 6 | DMS | 20 | 19 |
| 7 | DMS | 50 | 43 |
| 8 (comp.) | DMS | 60 | emulsion gelled | comp. = comparative

As can be seen, gellation occurs when the ester level gets too high and the polymer becomes insoluble in the aqueous phase of the emulsion.

EXAMPLE 9

Esterification of an Ammonium Poly(acrylate) Emulsion with Dimethyl Sulfate

To 300 parts of homopolymeric ammonium poly (acrylate) oil-continuous emulsion (30% polymer solids; M.W. range 10–20 million) are added 48.3 parts of dimethyl sulfate. The mixture is stirred vigorously for 2 hours. Carbon 13 NMR indicates 27% methyl ester in the of over 10 million weight average molecular weight.

EXAMPLES 10–15

Using the general procedure of Example 9, a range of esterified poly(acrylate) polymers are prepared using dimethyl sulfate (DMS). The results are shown in Table II, below, to be substantially equivalent.

TABLE II

| Example | Alkylating Agent | Addition Level, Mole % | % Acid Converted to Ester, NMR Analysis |
|---|---|---|---|
| 10 | DMS | 5 | 7 |
| 11 | DMS | 10 | 11 |
| 12 | DMS | 20 | 18 |
| 13 | DMS | 50 | 42 |
| 14 | DMS | 70 | 53 |
| 15 (comp.) | DMS | 100 | product precipitated |

(comp.) = comparative

Again, precipitation (gellation) occurs when the ester polymer becomes insoluble in water.

EXAMPLE 16

Esterification of a Sodium Poly(acrylate) Emulsion with Methyl Chloride

To 300 parts of homopolymeric sodium poly(acrylate) oil-continuous emulsion (21.4% polymer solids; M.W. range 10 to 20 million) in a high-pressure autoclave are added 70.7 parts of methyl chloride. The reaction is heated to 80°0C. for 2 hours with vigorous stirring. Carbon 13 NMR indicates 15% methyl ester in the final copolymer of over 10 million weight average molecular weight.

EXAMPLES 17–23

Using the procedure in Example 16, a range of esterified poly(acrylate) emulsions are prepared using various alkylating agents. The results are set forth in Table III, below. Again, they are substantially equivalent.

TABLE III

| Example | Alkylating Agent | Alkylation Level, Mole | Reaction Temperature °C. | After 3 Hours-% Acid Converted |
|---|---|---|---|---|
| 17 | Methyl bromide | 20 | 80 | 100 |
| 18 | Methyl bromide | 20 | 80 | 15 |
| 19 | Epichlorohydrin | 20 | 60 | 30 |
| 20 | Propylene Oxide | 20 | 90 | 4 (gel) |
| 21 | 1,2 Epoxy butane | 20 | 100 | 2 (gel) |
| 22 | Allyl Chloride | 50 | 80 | 7 |
| 23 | Allyl Chloride | 50 | 100 | 16 (gel) |

EXAMPLE 24

Esterification of a Sodium Poly(acrylate) Emulsion with Ethyl Chloride

To 300 parts of homopolymeric sodium poly(acrylate) oil-continuous emulsion (21.4% polymer solids; M.W. range 10 to 20 million) in a high-pressure autoclave are added 84 parts of ethyl chloride and 14.9 parts of 10% Kl solution. The reaction is heated to 100° C. for 3 hours with vigorous stirring after which infrared analysis indicates 16% esterification resulting in a copolymer of weight average molecular weight over 10 million.

EXAMPLE 25

Esterification of a Sodium Poly(acrylate) Emulsion with Ally Chloride

To 300 parts of homopolymeric sodium poly(acrylate) oil-continuous emulsion (21.4% polymer solids; M.W. range 10 to 20 million) in a high-pressure autoclave are added 31.8 parts of allyl chloride and 13 parts of 10% Kl solution. The reaction is heated to 80° C. for 2.5 hours with vigorous stirring, after which carbon 13 analysis indicates 7% esterification. The weight average molecular weight of the copolymer produced remains about the same as the charge polymer.

EXAMPLE 26

Esterification of a Sodium Poly(acrylate) Emulsion with Epichlorohydrin

To 300 parts of homopolymeric sodium poly(acrylate) oil-continuous emulsion (21.4% polymer solids; M.W. over 10 million) are added 16.5 parts of epichlorohydrin. After stirring vigorously for 0.25 hour, the reaction is heated to 60° C. without stirring for 8 hours. Carbon 13 NMR indicates 30% ester in the final copolymer of about the same weight average molecular weight as the charge polymer.

EXAMPLE 27

Esterification of a Copolymer Emulsion with Dimethyl Sulfate

To 300 parts of a 50:50 sodium acrylate/acrylamide copolymer oil-continuous emulsion (24.7% polymer solids; M.W. about 15 million) are added 26 parts of dimethyl sulfate (DMS). The mixture is mixed vigorously for 2.5 hours. Carbon 13 NMR indicates 17% conversion of the carboxylic acid groups to methyl ester in the final terpolymer, representing an 85% yield based on DMS. The weight average molecular weight of the terpolymer is also about 15 million.

EXAMPLES 28–32

The procedure of Example 27 is used to esterify acrylic acid copolymers of varying compositions. The results are set forth in Table IV, below.

TABLE IV

| Example | Copolymer AA/AMD* | DMS Addition Additional Level, Mole % | % Acid Converted to Ester |
|---|---|---|---|
| 29 | 10:90 | 10 | 10 |
| 30 | 30:70 | 30 | 30 (IR) |
| 31 | 50:50 | 50 | 50 (IR) |
| 32 | 90:10 | 20 | 15 (NMR) |
| 33 | 90:10 | 30 | 32 (NMR) |

*AA = acrylic acid
AMD = acrylamide

EXAMPLE 33

Esterification of a Copolymer Emulsion with Methyl Chloride

To 300 parts of a sodium acrylate/acrylamide 50/50 copolymer are continuous emulsion (24.7% polymer solids; M.W. 15 million) in a high-pressure autoclave added 39.6 parts of methyl chloride and 17.3 parts of 10% Kl solution. The reaction is heated to 80° C. for 3 hours with vigorous stirring. Carbon 13 NMR indicates 14% methyl ester in the final terpolymer whose weight average molecular weight is over 15 million.

EXAMPLE 34

To 300 parts of the emulsion copolymer (30% ester) of Example 1 are added an aqueous solution containing 63.3 parts of 30% hydroxylamine sulfate, 83 parts of 50% sodium hydroxide (100 mole% excess based on total monomer) and 12 parts of sodium thiosulfate as a stabilizer. The mixture is mixed vigorously for 1 hour. The resulting terpolymer contains 12% hydroxamate according to carbon 13 NMR analysis, 18% methyl acrylate and 70% acrylic acid recurring units. The weight average molecular weight is virtually unchanged.

EXAMPLES 35–47

The procedure described in Example 35 is again used to hydroxamate the acrylic acid/methyl acrylate copolymer of Example 1 under a variety of reaction stoichiometries. The results are set forth in the table immediately below.

| Example | Excess Caustic*-% | Moles of HXamine to Ester Group | Ester | Carboxylate | Hydroxamate |
|---|---|---|---|---|---|
| 35C | 0 | 1.00 | 30 | 70 | 0 |
| 36 | 10 | 1.00 | 21 | 71 | 8 |
| 37 | 20 | 1.00 | 20 | 72 | 8 |
| 38 | 25 | 1.00 | 12 | 84 | 4 |
| 39 | 30 | 1.00 | 10 | 86 | 4 |
| 40 | 35 | 1.00 | 3 | 89 | 8 |
| 41 | 40 | 1.00 | 0 | 92 | 8 |
| 42 | 50 | 1.00 | 0 | 88 | 12 |
| 43 | 100 | 0.20 | 0 | 96 | 4 |
| 44 | 100 | 0.35 | 0 | 95 | 5 |
| 45 | 100 | 0.50 | 0 | 93 | 7 |
| 46 | 100 | 1.00 | 0 | 88 | 12 |
| 47 | 100 | 2.50 | 0 | 88 | 12 |

*Based on total monomer
HX = hydroxyl

EXAMPLE 48

A 90:10 ammonium acrylate/acrylamide copolymer emulsion product (25.4% polymer solids-weight average M.W. =11 million) is esterified to the extent of 30% using dimethyl sulfate, accordance with Example 1. To 300 parts of the ester terpolymer are added an aqueous reagent solution containing 95.6 parts of 30% hydroxylamine sulfate, 114 parts of 50% sodium hydroxide (100 mole % excess based on total monomer) and 23 parts of sodium thiosulfate as a stabilizer. The reaction mixture is agitated vigorously for 1 hour. The resulting product contains 9% hydroxamate, 10% amide and 81 % carboxyl groups according to carbon 13 NMR analysis and has a weight average molecular weight of about 11 million.

EXAMPLES 49–56

The esterified polymers of Examples 17–23, inclusive, are hydroxamated in accordance with the procedure of Example 34. In each instance, similar results are achieved.

EXAMPLES 57–66

The hydroxamated polymer of Example 45 is compared with a conventional commercial polyacrylate red mud flocculant and two commercially available hydroxamated polymers derived by hydroxamation of amide polymers. Evaluations are carried out by first digesting at elevated temperature and pressure a difficult-to- flocculate Jamaican bauxite in alumina plant spent liquor to obtain a slurry containing approximately 100 g/L of mud solids, and then diluting said slurry with additional spent liquor to provide a slurry with 40 g/L of mud solids. Portions of the hot slurry are placed in one liter graduated cylinders and flocculated by adding thereto varying amounts of the flocculants to be tested as dilute aqueous solutions, mixing the added flocculant with the slurry by means of a perforated plunger. The settling rate of the mud interface and the clarity of the supernatant liquor after mud settling are then measured.

| Example | Flocculant | Dosage Level, g/T | Settling Rate, m/hr. | Clarity, Mg/L |
|---|---|---|---|---|
| 57C | Polyacrylate | 234 | 0.2 | >540 |
| 58C | Commercial Hydroxamate Polymer A | 184 | 20 | 38 |
| 59C | Commercial Hydroxamate Polymer A | 138 | 18 | 45 |
| 60C | Commercial Hydroxamate Polymer A | 92 | 7 | 144 |
| 61C | Commercial Hydroxamate Polymer B | 172 | 12 | 6 |

-continued

| Example | Flocculant | Dosage Level, g/T | Settling Rate, m/hr. | Clarity, Mg/L |
|---|---|---|---|---|
| 62C | Commercial Hydroxamate Polymer B | 128 | 11 | 72 |
| 63C | Commercial Hydroxamate Polymer B | 86 | 5 | 48 |
| 64 | Polymer of Example 45 | 164 | 33 | 14 |
| 65 | Polymer of Example 45 | 123 | 14 | 6 |
| 66 | Polymer of Example 45 | 82 | 9 | 22 |

C = comparative
Polymer A = 9% hydroxamation - wt. ave. m.w. 20 million
Polymer B = 18% hydroxamation - wt. ave. m.w. 20 milion

EXAMPLES 67–80

Hydroxamated polymers of the instant invention are evaluated in the laboratory using a red mud slurry from an operating Bayer alumina plant. The laboratory settling tests are carried out similarly to those described for Examples 57–66, except that the hot slurry is taken from the plant instead of being prepared in a laboratory digestion.

| Example | Flocculant | Dosage Level, g/T | Settling Rate, m/hr. | Clarity, Mg/L |
|---|---|---|---|---|
| 67 | Polymer of Example 45 | 64 | 9 | 124 |
| 68 | Polymer of Example 45 | 85 | 15 | 100 |
| 69 | Polymer of Example 45 | 108 | 39 | 112 |
| 70 | Polymer of Example 46 | 64 | 10 | 121 |
| 71 | Polymer of Example 46 | 85 | 31 | 137 |
| 72 | Polymer of Example 46 | 108 | 47 | 121 |
| 73 | Polymer of Example 44 | 64 | 11 | 154 |
| 74 | Polymer of Example 44 | 85 | 14 | 161 |
| 75C | Commercial Hydroxamate Polymer A | 72 | 11 | 126 |
| 76C | Commercial Hydroxamate Polymer A | 97 | 34 | 125 |
| 77C | Commercial Hydroxamate Polymer A | 121 | 77 | 125 |
| 78C | Commercial Hydroxamate Polymer C | 74 | 8 | 71 |
| 79C | Commercial Hydroxamate Polymer C | 92 | 15 | 62 |
| 80C | Commercial Hydroxamate Polymer C | 99 | 28 | 73 |
| 81C | Commercial Hydroxamate Polymer C | 124 | 45 | 61 |

C = comparative
Polymer A = 9% hydroxamation - wt. ave. m.w. 20 miilion
Polymer C = 14% hydroxamation - wt. ave. m.w. 20 million

We claim:

1. A method which comprises esterifying a water-soluble polymer of an acrylic acid or salt thereof having a weight average molecular weight of over about 1 million in aqueous solution and hydroxamating the resultant esterified polymer, wherein said water-soluble polymer is in the dispersed phase of a water-in-oil emulsion.

2. The method of claim 1 wherein the polymer to be esterified contains at least 5%, by weight, of acrylic acid.

3. The method of claim 2 wherein the polymer to be esterified has a weight average molecular weight of at least about 5 million.

4. The method of claim 2 wherein the polymer to be esterified has a weight average molecular weight of at least about 10 million.

5. The method of claim 1 wherein the esterified polymer is at least about 5% esterified.

6. The method of claim 5 wherein the esterified polymer is at least about 5% to about 50% esterified.

7. The method of claim 6 wherein the esterified polymer is at least about 10% to about 40% esterified.

8. The method of claim 1 wherein the hydroxamated polymer is at least about 5% hydroxamated.

9. The method of claim 8 wherein the hydroxamated polymer is at least about 10% hydroxamated.

10. The method of claim 1 wherein the esterification is achieved by contacting the water-soluble polymer with an alkylating agent at a temperature of from about 0° to about 80° C.

11. The method of claim 1 wherein the hydroxamation is achieved by contacting the esterified polymer with an hydroxylamine at a pH above at least about 7.0 at a temperature of from about 10° to about 80° C.

12. A method which comprises esterifying a water-soluble polymer of an acrylic acid salt having a weight average molecular weight of over about 1 million in aqueous solution and hydroxamating the resultant esterified polymer, wherein said water-soluble polymer is in the dispersed phase of a water-in-oil emulsion and wherein said acrylic acid salt is an ammonium or sodium salt.

* * * * *